United States Patent

[11] 3,547,105

[72] Inventors T. O. Paine
Deputy Administrator of the National
Aeronautics and Space Administration with
Respect to an Invention of;
Frank B. Ramme, Lancaster, Calif.
[21] Appl. No. 760,389
[22] Filed Aug. 29, 1968
[45] Patented Dec. 15, 1970

[54] FLEXIBLE CONDUCTIVE DISC ELECTRODE
4 Claims, 6 Drawing Figs.
[52] U.S. Cl. ................................................ 128/2.06
[51] Int. Cl. .................................................. A61b 5/04
[50] Field of Search .......................................... 128/2.06,
2.1, 362, 379—383, 390—404, 410, 411,
416—418

[56] References Cited
UNITED STATES PATENTS
1,989,282  1/1935  Kimble et al. ................ 128/416
3,029,808  4/1962  Kagan ........................... 128/2.06
3,170,459  2/1965  Phipps et al. .................. 128/2.06
3,426,746  2/1969  Seamans, Jr. ................. 128/2.06
3,464,404  9/1969  Mason ........................... 128/2.06

Primary Examiner—William E. Kamm
Attorney—Monte F. Mott, J. H. Warden and G. T. McCoy ABSTRACT: A dry, electrode featuring a wire sandwiched between two discs cut from sheets of a flexible conductive material. The electrodes are made by mixing silver powder with a cement, diluting the mixture with a suitable solvent for the cement and applying it in a thin layer to a surface from which it can be removed as a film when dry; cutting or shaping the dried film to form the size electrodes desired; placing a wire lead on the cut film piece; applying a small amount of solvent to the film surface having the wire thereon; and pressing a second piece of the dried film thereto to form the electrode of the invention.

PATENTED DEC 15 1970
3,547,105
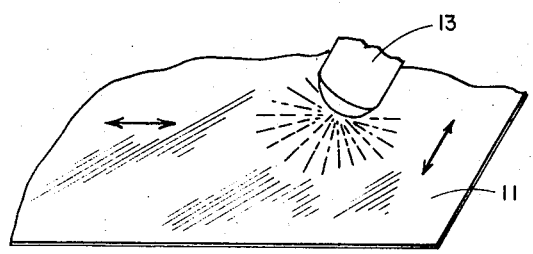
FIG. 1a
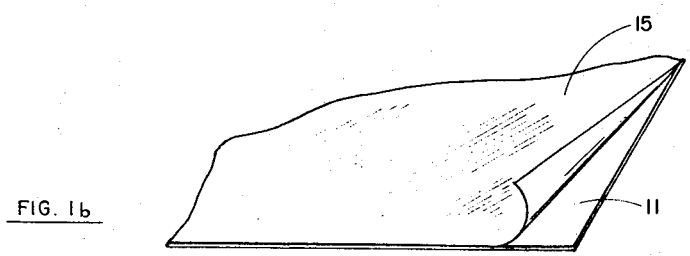
FIG. 1b
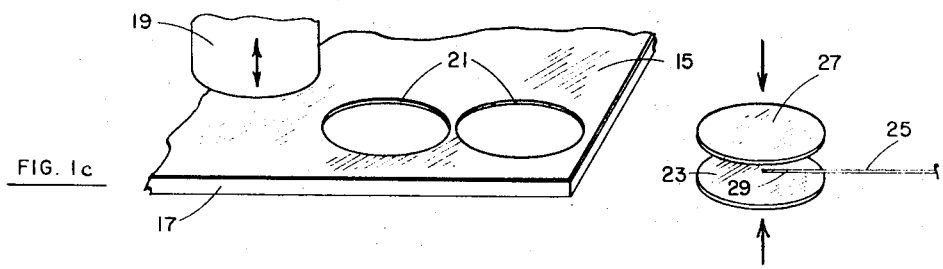
FIG. 1c
FIG. 1d
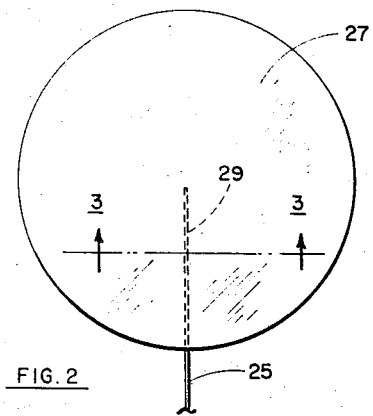
FIG. 2
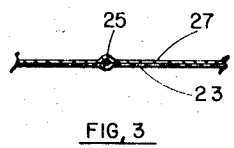
FIG. 3
INVENTOR
FRANK B. RAMME
BY
ATTORNEYS

3,547,105

FLEXIBLE CONDUCTIVE DISC ELECTRODE

ORIGIN OF INVENTION

The invention described herein was made in the performance of work under a NASA contract and is subject to the provision of Section 305 of the National Aeronautics and Space Act of 1958, Public Law 83-568 (72 stat. 435; 42 USC 2457).

BACKGROUND OF THE INVENTION

1. Field of the Invention

The invention is in the field of dry electrodes. More particularly the invention is in the field of dry electrodes for use in physiological monitoring of individuals.

2. Description of the Prior Art

Prior to the herein invention there have been developed dry electrodes for application to individuals. The electrodes were for physiological monitoring, such as for electrocardiograms and electroencephalograms. This work is described in NASA Technical Note D-3414, May 1966, "Dry Electrodes for Physiological Monitoring," by Charles W. Patten, Frank B. Ramme and James A. Roman. This prior method involved forming a solution of conductive electrode material to be sprayed on to the individual. The solution was comprised of powdered silver in a cement, such as Duco cement made by the DuPont Company, which is cellulose nitrate dissolved in a suitable solvent. The viscosity was controlled by adding more solvent for the cement such as acetone, so that the mixture could be readily sprayed through an atomizer. Upon evaporation of the solvent from the sprayed mixture, a dry conductive electrode of the silver disposed in the cement would reside on the person sprayed.

In the practice of this prior technique, a small amount of conventional electrode jelly was wiped on the area of the skin to which the electrode was to be applied. The lead wire utilized was Teflon insulated copper wire that had a pin connector on one end for eventual connection to the readout instrument, while the other end of the wire was stripped with a small epoxy ball fastened to the end tip. The stripped end of the wire with the ball thereon was placed against the nozzle of the spray gun utilized. The nozzle was then placed against the skin and centered over the jelly coat. A coating of the conductive cement mixture was then sprayed onto the skin to form about a half-dollar size electrode and capture the lead wire in the cement. The same spray gun was then utilized by a valve control to spray air only against the dried electrode to rapidly dry it.

Care had to be taken to withdraw the gun about two seconds after the start of the air dry to prevent the gun from adhering to the sprayed area on the skin. The aforegoing steps were repeated for each electrode to be applied to the individual. Normally three different electrodes are applied, for example, in taking electrocardiograms. Additionally, for best results, the wire should not contact the skin. Thus, a thin coat of the conductive mixture is preferably sprayed and dried before the wire is pressed onto the skin, then the spraying continued to place a further coat over it and the wire. As can be seen the aforegoing is a fairly time consuming process with certain critical steps. Additionally, the equipment to spray the conductive mixture is relatively expensive and is subject to fouling or clogging and the like. Thus, though the concept of forming electrodes in situ on the body would appear to be expeditious and advantageous, there are several drawbacks.

Thus, an object of this invention is to provide a dry electrode which is prefabricated prior to application to subject.

Another object of this invention is to provide a dry electrode which is readily and easily applicable to a subject.

SUMMARY OF THE INVENTION

The herein invention comprises mixing a suitable cement, such as a cellulose nitrate type cement, with silver powder in about a 50 : 50 weight ratio, together with enough solvent to provide a fluid mixture to be sprayed. The solvent preferably used is an organic material such as acetone. The mixture is then sprayed on a sheet of inert material such as polyethylene to a desired thickness. After drying, the conductive cement is detached from the plastic sheet and placed upon a sheet of material such as rubber so that discs can be punched from the cement. Utilizing a conventional punch, discs of any chosen diameter can then be provided from the dried sheet of conductive cement. To form the completed electrode a wire having a stripped end is placed on one disc resting on a sheet of inert plastic, a drop or two of acetone or other suitable solvent for the cement is then placed on the disc, and a second disc immediately then pressed over the wire to the underlying first disc to form a sandwich about the wire. The product is again allowed to dry. The final dry electrode thus has two discs sandwiched about the lead wire. The two discs, of course, are held together by the adhesive action due to the action of the solvent and can then be readily applied to the subject by wiping a desired section of the subject's body with acetone and pressing the dried disc on that area, leaving it there until the acetone evaporates. It is believed the invention will be better understood from the following detailed description and drawings in which:

FIGS. 1a—1d schematically depict the steps of forming the dry electrode of this invention;

FIG. 2 is a top view of a dry electrode of the invention;

FIG. 3 is a sectional view taken along line 3–3 of FIG. 2.

DESCRIPTION OF THE PREFERRED EMBODIMENTS

Turning now to the drawing there is seen in FIG. 1a, a sheet of plastic 11 with a nozzle 13 from an atomizer or like assembly disposed adjacent thereto. The nozzle 13 sprays a conductive cement on the plastic 11. The conductive cement can be of a variety of materials. It has been found that the metal portion of the cement should be preferably silver powder. The metal should be conductive. However, it should not readily oxidize since this interferes with the electrical properties. For this reason, silver is preferable over a material such as copper. Another metal that could be used is platinum. However, it is considerably more expensive.

The metal powder is initially mixed with a cement material which should be fast drying and adherent to the skin. It is apparent that the basic cement material should also be inert to the body so that it will not irritate or cause discomfort. Additionally, it is important that after the cement has dried it can be readily redissolved at its surface so that one can easily and subsequently attach the formed electrode to the body. Thus, various organic cements such as cellulose nitrate, cellulose acetate, polyvinyl acetate and various acrylic resin adhesives are contemplated. These materials all possess the foregoing adhesive qualities and can be readily and easily dissolved in an organic solvent which will evaporate readily.

The organic solvent which serves the purpose of decreasing the viscosity of the cement so that it can be easily sprayed from the atomizer head 13, should also, of course, be a material that will be tolerated by the body as well as rapidly evaporating. Acetone is found to be preferable as a solvent material to serve the aforegoing purposes. However, other organic materials such as methyl ethyl ketone, butyl acetate, amyl acetate, and the like can be utilized in addition to or in place of acetone.

To form the initial mixture, silver or other metal used is added to the cement on the weight ratio of 90 to 110 percent of silver to the amount of cement present. The amount of acetone or other suitable solvent added to the mixture depends solely upon the spray apparatus utilized. Only enough acetone should be used so that an adequate spray can be obtained. Too fluid a material is not readily handled, and the thickness cannot be easily controlled when applied to the plastic sheet 11. The plastic sheet 11 should be of a material that is inert to the cement so it will not adhere to it. For example, a typical plastic would be polyethylene plastic.

To control the thickness of the conductive cement applied to the plastic sheet 11, one can maintain the surface area of a portion of the sheet at a given size, and vary the amount of material applied to that surface. Thus, by applying twice the quantity of the conductive cement to a given surface area, one will double the thickness of the final product. The thickness is not critical. The cement product can vary from about 7 mils to one that is several times as thick.

After the conductive cement has been sprayed onto the surface 11, it is allowed to dry. This can be aided by means of a fan to circulate air over the surface, aiding in the evaporation of the solvent used. Upon completion of the drying, the conductive cement 15 is then peeled, as in FIG. 1b, from the base 11. This produces a continuous sheet of a desired thickness of conductive cement.

The dried sheet of conductive cement 15, after it is peeled as shown in FIG. 1b, is then placed as seen in FIG. 1c, on a mat 17 of hard rubber or the like. A punch 19 is then used to cut disc elements from the sheet 15 as seen at the remaining holes 21. The discs removed are preferably the size of a half-dollar but can obviously be of any suitable diameter.

To form the complete electrode element, two discs, as shown in FIG. 1d, are utilized. A first disc 23 has a drop or two of solvent applied to its surface. The lead wire 25 is then laid upon the disc as shown. A second disc 27 is then placed on top of the first disc 23, sandwiching the wire there between, and pressed upon the first disc 23. The solvent rapidly evaporates, leaving a solid electrode member. The last operation can be performed while the bottom disc 23 is once again resting on a sheet of plastic material similar to or the same as the sheet used in the initial spraying step shown in FIG. 1a.

FIGS. 2 and 3 combined show a completed unit. The insulated lead wire 25 preferably is exposed along the portion 29 that extends between the two discs 23 and 27, and is silver plated thereat to provide a nonoxidative surface in this region, as well as improve the conductivity from the conductive cement to the wire. The wire 25 is then capable of being connected to a suitable plug which can also receive the other electrodes utilized. The plug in turn can be attached to a line fed into an electrocardiogram apparatus or the like.

To use the completed dry electrode as shown in FIGS. 2 and 3, a portion of the body to which the electrode is to be applied is wiped or dabbed with the solvent used for the cement, such as, for example, acetone. The electrode is also wetted with solvent, then immediately pressed upon the wet area of the body and held for a second or two until the electrode has started to adhere. It has been found that the cement is not conductive when wet with solvent. Thus, one of the advantages of the herein invention as compared to the prior art spraying device is that the electrode when applied is basically dry. This small layer of solvent is absorbed into the skin as well as the dry electrode at an extremely rapid rate. Thus, the electrode is ready for use much sooner than in the spray-on device which takes longer to dry.

In order to remove the electrode from the body, one can simply peel it off in the manner of an adhesive bandage, or alternatively, where the area might be covered with hair or the like, the entire electrode can be dissolved when wiped with the liquid solvent. The invention will be fully understood from the following example.

EXAMPLE

To form a conductive cement mixture capable of being sprayed, 43 grams of Duco household cement, manufactured by E. I. DuPont de Nemours & Company, which is a cellulose nitrate cement, containing acetone and butyl acetate as solvents therefor together with a high boiling ester plasticizer, was mixed with 43 grams of silver powder and 100 milliliters of acetone. The mixture was sprayed onto a sheet of polyethylene plastic over a square area of 6 by 6 inches. This produced a thickness of approximately 7 mils over that area. The conductive layer was then permitted to dry into a pliable nontacky solid surface on the plastic sheet. The conductive layer was then peeled off of the underlying plastic and laid upon a sheet of neoprene rubber. Discs of three-fourths inch diameter were then cut with a punch from the sheet of conductive cement. To form the completed electrode, a cut disc was then laid upon a sheet of polyethylene. Two drops of acetone were placed on the top exposed surface of the disc and a lead wire, which was silver plated in the region of contact with the disc, was laid upon it. Immediately, a second disc a was then placed on top of the first one sandwiching the wire therebetween. Pressure was applied to the two discs for a second or two to allow the acetone solvent to thoroughly blend the two discs together about the wire. The electrode together with its lead wire was then ready to be attached to a suitable plug for eventual connection to a readout apparatus.

It should be apparent that the invention can be practiced with obvious modifications to the process described. For example, the initial mixture of conductive cement can be applied by methods other than spraying. It can be rolled onto a base or applied through a dipping. In other words, various techniques can be used to obtain a dry film of the conductive cement to be cut into discs.

Additionally, the conductive cement does not have to be removed from the base prior to punching the discs. It is just believed to facilitate the separation of the cement from the plastic sheet if it is accomplished before the discs are punched.

I claim:

1. A dry electrode for application to the body comprising:
    two discs of cement that is soluble in an organic solvent, said cement having sufficient metal powder dispersed therethrough to provide electrical conductivity;
    an electrical lead wire; and
    means securing said discs to each other sandwiching one end of said wire therebetween.

2. The electrode of claim 1, wherein said means for securing said discs comprises an amount of solvent for said discs sufficient only to soften a surface layer of said discs.

3. The electrode of claim 1 wherein said cement is selected from the group consisting of cellulose nitrate and cellulose acetate, and wherein said metal powder is silver.

4. The device of claim 3 wherein the portion of said wire sandwiched between said discs is silver plated.